US012626386B2

(12) United States Patent　(10) Patent No.:　US 12,626,386 B2

Idomoto et al.　(45) Date of Patent:　May 12, 2026

(54) BENDING ANGLE DETERMINING METHOD AND DETERMINING DEVICE

(71) Applicant: Kubota Corporation, Osaka (JP)

(72) Inventors: Yasushi Idomoto, Amagasaki (JP); Kazuma Harada, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 252 days.

(21) Appl. No.: 18/561,478

(22) PCT Filed: Apr. 25, 2022

(86) PCT No.: PCT/JP2022/018670

§ 371 (c)(1),
(2) Date: Nov. 16, 2023

(87) PCT Pub. No.: WO2022/244598

PCT Pub. Date: Nov. 24, 2022

(65) Prior Publication Data

US 2024/0233161 A1　　Jul. 11, 2024

(30) Foreign Application Priority Data

May 21, 2021　(JP) ................................. 2021-086264

(51) Int. Cl.
　　*G06T 7/60*　　(2017.01)
　　*G06T 7/00*　　(2017.01)
(52) U.S. Cl.
　　CPC .............. *G06T 7/60* (2013.01); *G06T 7/0002* (2013.01)

(58) Field of Classification Search
　　CPC .......... G06T 7/60; G06T 7/0002; G01B 11/26
　　See application file for complete search history.

(56) References Cited

U.S. PATENT DOCUMENTS

| 6,732,445 | B1 | 5/2004 | Scoville |
| 11,941,834 | B2 * | 3/2024 | Selensky ................... G06T 7/60 |
| 2002/0029127 | A1 | 3/2002 | Wakashiro |
| 2013/0204426 | A1 | 8/2013 | Tanuma et al. |

(Continued)

FOREIGN PATENT DOCUMENTS

| CN | 103189809 A | 7/2013 |
| CN | 104848858 A | 8/2015 |

(Continued)

OTHER PUBLICATIONS

English translation of JP 49-035055 A, published Apr. 1, 1974.*

(Continued)

*Primary Examiner* — Xuemei G Chen

(74) *Attorney, Agent, or Firm* — Harness, Dickey & Pierce, P.L.C.

(57)　　　　　ABSTRACT

Achieved is a determination method which enables accurate determination as to a bending angle. A bending angle determination method includes: an input reception step of receiving, with respect to a joint at which a first pipe and a second pipe are joined together, inputs of respective parameters of a plurality of predetermined positions set in a circumferential direction of the first pipe; and a bending angle determination step of determining whether a bending angle at the joint is appropriate, on the basis of the parameters that have been inputted in the input reception step.

4 Claims, 23 Drawing Sheets

(56) References Cited

U.S. PATENT DOCUMENTS

| | | | | |
|---|---|---|---|---|
| 2013/0269981 A1* | 10/2013 | Shiga | ........................ | H02G 3/06 |
| | | | | 174/136 |
| 2016/0290540 A1 | 10/2016 | Kishi et al. | | |
| 2018/0045499 A1* | 2/2018 | Ikeda | ........................ | G01B 5/02 |
| 2018/0087898 A1 | 3/2018 | Akagi et al. | | |
| 2018/0196982 A1* | 7/2018 | Panchawagh | ...... | G06V 40/1353 |
| 2018/0209869 A1* | 7/2018 | Kishi | .................. | G01M 5/0025 |
| 2020/0279084 A1 | 9/2020 | Davis et al. | | |
| 2022/0244043 A1* | 8/2022 | Kishi | ..................... | G06T 7/564 |

FOREIGN PATENT DOCUMENTS

| CN | 107076549 A | 8/2017 |
|---|---|---|
| CN | 107576281 A | 1/2018 |
| CN | 109631820 A | 4/2019 |
| CN | 109669425 A | 4/2019 |
| CN | 110849291 A | 2/2020 |
| CN | 110986826 A | 4/2020 |
| CN | 111272119 A | 6/2020 |
| EP | 3098564 A1 | 11/2016 |
| JP | 03-167412 A | 7/1991 |
| JP | 9-196637 | 7/1997 |
| JP | 10-148508 | 6/1998 |
| JP | 10-162140 | 6/1998 |
| JP | 11-39490 | 2/1999 |
| JP | 11-51611 | 2/1999 |
| JP | 2001-141419 A | 5/2001 |
| JP | 2002-099902 A | 4/2002 |
| JP | 2003-269939 A | 9/2003 |
| JP | 2007-192721 A | 8/2007 |
| JP | 49-35055 B2 | 5/2012 |
| JP | 2014-531636 A | 11/2014 |
| JP | 2016-4483 A | 1/2016 |
| JP | 2017-151031 A | 8/2017 |
| JP | 2018-20356 A | 2/2018 |
| KR | 2017-0130023 A | 11/2017 |
| KR | 2017-0135790 A | 12/2017 |
| WO | WO-2013/033442 A1 | 3/2013 |
| WO | WO-2015/053117 A1 | 4/2015 |
| WO | WO-2020/262214 A1 | 12/2020 |
| WO | WO-2021/107200 A1 | 6/2021 |

OTHER PUBLICATIONS

International Search Report and Written Opinion and English translations thereof dated Sep. 8, 2020.

Japanese Office Action and English translation thereof dated Nov. 22, 2022.

Shimakura et al., "The shape measurement of piping materials using two or more stereo images", The 74th national conference lecture collected-papers (2), Artificial intelligence and cognitive science, Japan, Mar. 6, 2012, pp. 2-21-2-22.

Japanese Notice of Allowance and English translation thereof of Japanese Application No. 2019-119881 mailed Apr. 4, 2023.

International Search Report and Written Opinion for PCT/JP2022/018670 and an English translation thereof mailed Jun. 28, 2022.

Kubota: "Assembling Procedure of GX Joint (Inch ver.) Kubota Corporation", Jun. 1, 2020 (Jun. 1, 2020), pp. 1-30, XP093271102, Retrieved from the Internet: URL:https://www.kubota.com/products/ironpipe/tech_info/pdf/ Assembling_manual/GX-Type_Joint.pdf [retrieved on Apr. 16, 2025].

Extended European Search Report for European Application No. 22804512.6 mailed May 8, 2025.

Taiwanese Office Action and English translation thereof for Taiwanese Application No. 111117424 mailed Mar. 25, 2025.

Taiwanese Office Action dated Dec. 29, 2023 for corresponding Taiwanese Patent Application No. 109121133 and its English-language translation.

U.S. Office Action dated Nov. 17, 2023 for corresponding U.S. Appl. No. 17/619,364.

Chinese Notice of Allowance and English translation thereof for Chinese Application No. 202080045758.0 mailed Jan. 9, 2025.

Quan Hou-de et al., "Study on Measurement Algorithm of Gun Servo Systems Performance", Fire Control&Command Control, vol. 34, No. 11, Nov. 2009.

Chinese Office Action for Chinese Application No. 202080045758.0 and English translation thereof dated May 11, 2024.

U.S. Appl. No. 17/619,364, filed Dec. 15, 2021.

Indian Hearing Notice for Indian Application No. 202117062309 mailed Jul. 30, 2025.

* cited by examiner

Start

S1

Capture image of pipe

S2

Extract contour of pipe

S3

Derive laying direction straight line

S4

Calculate crossing angle between laying direction straight lines

End

1

10 Arithmetic apparatus

20 Camera

11 Image acquisition section

12 Contour extraction section

40 Storage device

13 Derivation section

14 Calculation section

30 Display device

15 Display processing section

Figure 26:
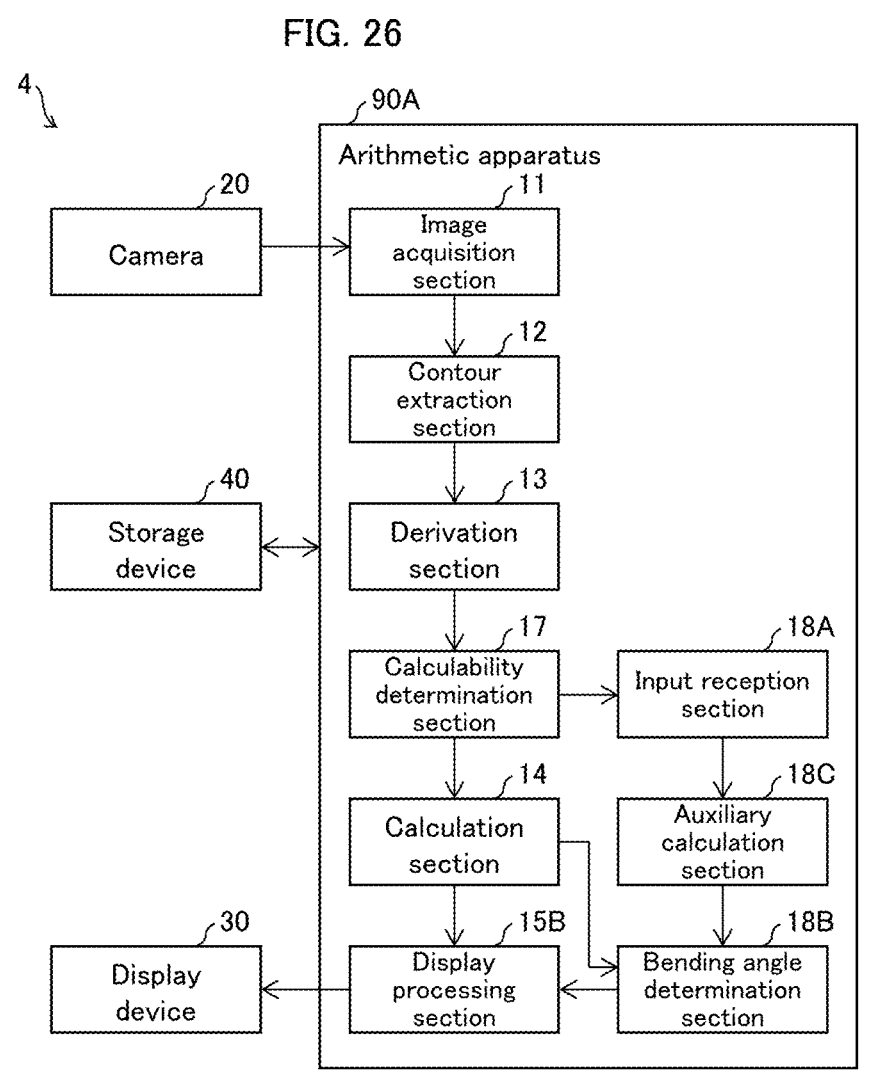

Arithmetic apparatus

20

Camera

11

Image acquisition section

12

Contour extraction section

40

Storage device

13

Derivation section

17

Calculability determination section

18A

Input reception section

14

Calculation section

18C

Auxiliary calculation section

30

Display device

15B

Display processing section

18B

Bending angle determination section

BENDING ANGLE DETERMINING METHOD AND DETERMINING DEVICE

TECHNICAL FIELD

The present invention relates to a calculation method and a calculation apparatus each for calculating a bending angle at a joining place where pipes are joined together.

BACKGROUND ART

At a joining place where pipes are joined together, the pipes need to be joined so that a bending angle between the pipes is within a permissible range. Examples of a method for determining whether the bending angle is within a permissible range include a method that uses the calculation method disclosed in Non-Patent Literature 1 to calculate a bending angle and makes determination. According to the calculation method, a distance between (a) a white line drawn on a circumferential surface of one of pipes and (b) an end surface of the other of the pipes is measured at a plurality of positions in a circumferential direction of the pipes, so that a bending angle is calculated by (i) a difference between a maximum value and a minimum value of the distance and (ii) a nominal diameter of the pipes.

CITATION LIST

Non-Patent Literature

[Non-patent Literature 1]
Japan Ductile Iron Pipe Association, "T-gata dakutairu tekkan setsugou youryousho [T-shaped Ductile Iron Pipe Joint Procedure Specification]", p. 21-22

SUMMARY OF INVENTION

Technical Problem

Another possible method for making determination as to a bending angle is, for example, a method that performs calculation and determination based on an image of the joining place where the pipes are joined together. However, according to this method, there is a possibility that the bending angle cannot be properly calculated, depending on, for example, a condition under which the image is captured.

It is an object of an aspect of the present invention to achieve, for example, a method that enables more accurate determination as to a bending angle.

Solution to Problem

In order to solve the foregoing problem, a bending angle determination method in accordance with an aspect of the present invention includes: an input reception step of receiving, with respect to a joint at which a spigot of a first pipe is inserted into a socket of a second pipe so as to join the first pipe and the second pipe together, inputs of respective parameters of a plurality of predetermined positions set in a circumferential direction of the first pipe, the parameters each indicating a degree to which the first pipe is inserted into the second pipe; and a bending angle determination step of determining, on the basis of the parameters that have been inputted in the input reception step, whether a bending angle at the joint is appropriate.

Further, a bending angle determination apparatus in accordance with an aspect of the present invention includes:

an input reception section configured to receive, with respect to a joint at which a spigot of a first pipe is inserted into a socket of a second pipe so as to join the first pipe and the second pipe together inputs of respective parameters of a plurality of predetermined positions set in a circumferential direction of the first pipe, the parameters each indicating a degree to which the first pipe is inserted into the second pipe; and a bending angle determination section configured to determine, on the basis of the parameters that have been inputted into and received by the input reception section, whether a bending angle at the joint is appropriate.

Advantageous Effects of Invention

An aspect of the present invention makes it possible to more accurately perform determination as to a bending angle.

BRIEF DESCRIPTION OF DRAWINGS

FIG. 26 is a block diagram illustrating a configuration of a main part of a bending angle determination system in accordance with Embodiment 4.

DESCRIPTION OF EMBODIMENTS

Embodiment 1

The following description will specifically discuss an embodiment of the present invention.

Figures 1, 2:
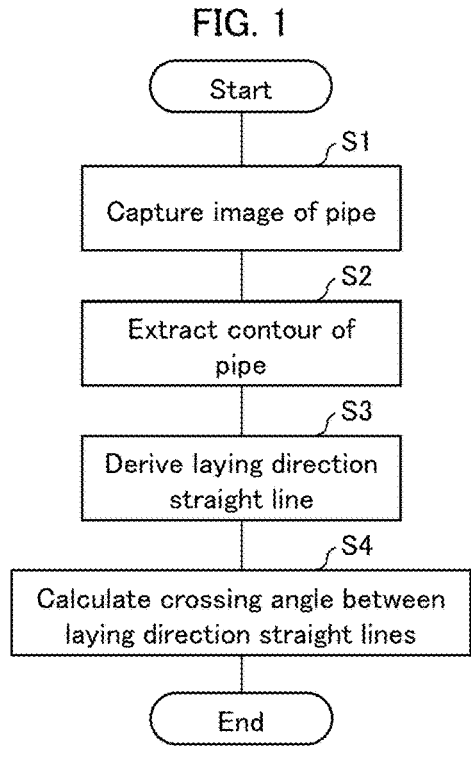
FIG. 1 is a flowchart showing a process carried out in a calculation system in accordance with Embodiment 1.
FIG. 2 is a block diagram illustrating a configuration of a main part of the calculation system in accordance with Embodiment 1.

FIG. 2 is a block diagram illustrating a configuration of a main part of a bending angle calculation system 1 in accordance with Embodiment 1 (hereinafter simply referred to as a "calculation system 1"). As illustrated in FIG. 2, the calculation system 1 includes an arithmetic apparatus 10, a camera 20, a display device 30, and a storage device 40.

The arithmetic apparatus 10 carries out a process for calculating a bending angle at a joining place where pipes are joined together. The arithmetic apparatus 10 includes an image acquisition section 11, a contour extraction section 12, a derivation section 13, a calculation section 14, and a display processing section 15.

The image acquisition section 11 acquires an image of a pipe in which a first pipe P1 and a second pipe P2 (see, for example, FIG. 3) are joined together by a joint. The first pipe P1 and the second pipe P2 can be made of a material that is not particularly limited and is metal or resin. The following description assumes that a spigot of the first pipe P1 is inserted into a socket of the second pipe P2, so that the first pipe P1 and the second pipe P2 are joined together. According to Embodiment 1, the image acquisition section 11 acquires an image captured by the camera 20. The contour extraction section 12 extracts respective contours of the first pipe P1 and the second pipe P2 in the image acquired by the image acquisition section 11.

The derivation section 13 derives, from the image acquired by the image acquisition section 11, a laying direction straight line corresponding to a laying direction of the pipe. According to Embodiment 1, the derivation section 13 derives the laying direction straight line in accordance with the respective contours of the pipes, the contours having been extracted by the contour extraction section 12. A specific process carried out by the derivation section 13 will be described later. The calculation section 14 calculates, as a bending angle at the joint between the first pipe P1 and the second pipe P2, a crossing angle between a laying direction straight line of the first pipe P1 and a laying direction straight line of the second pipe P2.

Note that "the laying direction straight line corresponding to the laying direction" is not limited to a straight line parallel to the laying direction and can be, for example, a straight line orthogonal to the laying direction. In a case where the laying direction straight line of either the first pipe P1 or the second pipe P2 is the straight line orthogonal to the laying direction, an angle obtained by subtracting the crossing angle between the laying direction straight lines from 90° serves as the bending angle at the joint between the first pipe P1 and the second pipe P2. In a case where the laying direction straight lines of both the first pipe P1 and the second pipe P2 are each the straight line orthogonal to the laying direction, the crossing angle between the laying direction straight lines serves as the bending angle at the joint between the first pipe P1 and the second pipe P2.

The display processing section 15 causes the display device 30 to display, for example, an image indicative of a result of calculation by the calculation section 14. The display processing section 15 causes the display device 30 to display, for example, an image indicative of a bending angle at a joining place where the first pipe P1 and the second pipe P2 are joined together, the bending angle having been calculated by the calculation section 14. Furthermore, in a case where the arithmetic apparatus 10 carries out a determination process for determining whether the bending angle calculated by the calculation section 14 is within a permissible range, the display processing section 15 can carry out a process for causing the display device 30 to display an image indicative of a result of the determination process.

The camera 20 is an image capturing device for capturing an image of the joining place where the first pipe P1 and the second pipe P2 are joined together. The camera 20 can be a universal camera to be attached to, for example, a smartphone, but is not limited to the universal camera. The display device 30 is a display device for displaying an image. The storage device 40 is a storage device that stores information necessary for a process carried out in the arithmetic apparatus 10. The camera 20, the display device 30, and the storage device 40 can be respective publicly-known devices without any particular limitation.

The calculation system 1 is used to calculate a bending angle of, for example, a pipe provided in a groove. The calculation system 1 is used under, for example, the following conditions. An image of the pipe is to be captured outdoors and can be captured in either the daytime or the nighttime. A distance from a ground surface to the pipe is set to approximately not less than 60 cm and not more than 120 cm. A distance from the camera 20 to the pipe is adjusted so that a range from an end surface of the second pipe P2 to 400 mm in the transverse direction is included in the image. The pipe is gray or black and has an uneven surface. The pipe has a diameter in a range of not less than 75 mm and not more than 400 mm. Note, however, that conditions under which the calculation system 1 is used are not limited to the above conditions.

FIG. 1 is a flowchart showing a process carried out in the calculation system 1. According to the calculation system 1, first, the image acquisition section 11 captures an image of the pipe in which the first pipe P1 and the second pipe P2 are joined together by the joint (S1, an image capturing step). Next, the contour extraction section 12 extracts the respective contours of the first pipe P1 and the second pipe P2 in the image of the pipe, the image having been captured in step S1 (S2, a contour extraction step).

The derivation section 13 derives, in accordance with the contours of the pipes, the contours having been extracted in step S2, the laying direction straight lines corresponding to the respective laying directions of the pipes (S3, a derivation step). The calculation section 14 calculates, as a bending angle at the joint, the crossing angle between the laying direction straight line of the first pipe P1 and the laying direction straight line of the second pipe P2 (S4, a calculation step).

Figure 3:
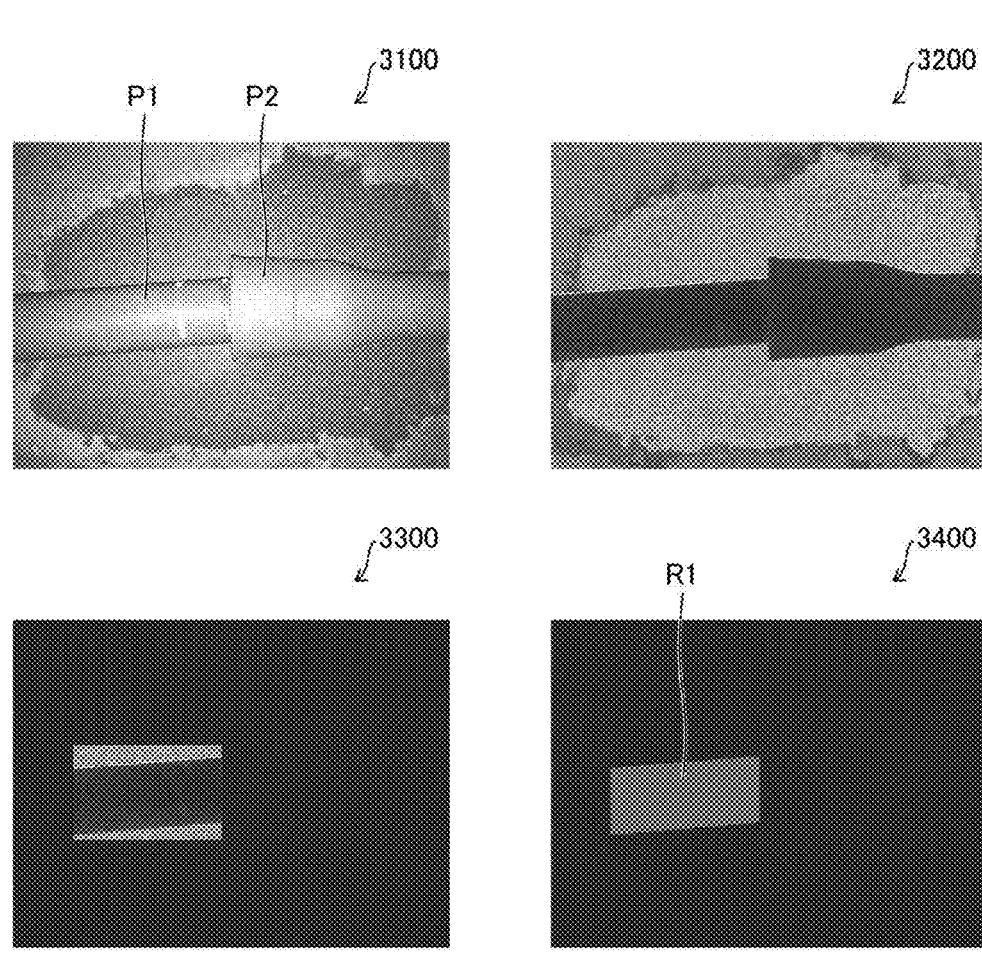
FIG. 3 is a view illustrating extraction of a contour of a first pipe by a contour extraction section.

FIG. 3 is a view illustrating extraction of the contour of the first pipe P1 by the contour extraction section 12. In FIG. 3, a reference sign 3100 indicates an example of a captured image captured by the camera 20. In a saturation image obtained by hue saturation value (HSV) transformation of the captured image, an image of the first pipe P1 and the second pipe P2 and an image of soil, which is a background, greatly differ in saturation. The contour extraction section 12 removes a high-saturation region, i.e., a region of the image of the first pipe P1 and the second pipe P2 from the saturation image so as to generate an image indicated by a reference sign 3200 in FIG. 3.

Furthermore, the contour extraction section 12 generates an image which is indicated by a reference sign 3300 in FIG. 3, in which only an image of a background at or near the first pipe P1 is left, and from which an unnecessary background has been removed. Moreover, the contour extraction section 12 generates an image which is indicated by a reference sign 3400 in FIG. 3 and in which only a region R1 of the first pipe P1 has been extracted. The contour extraction section 12 extracts a contour of the region R1 as the contour of the first pipe P1.

Figure 4:
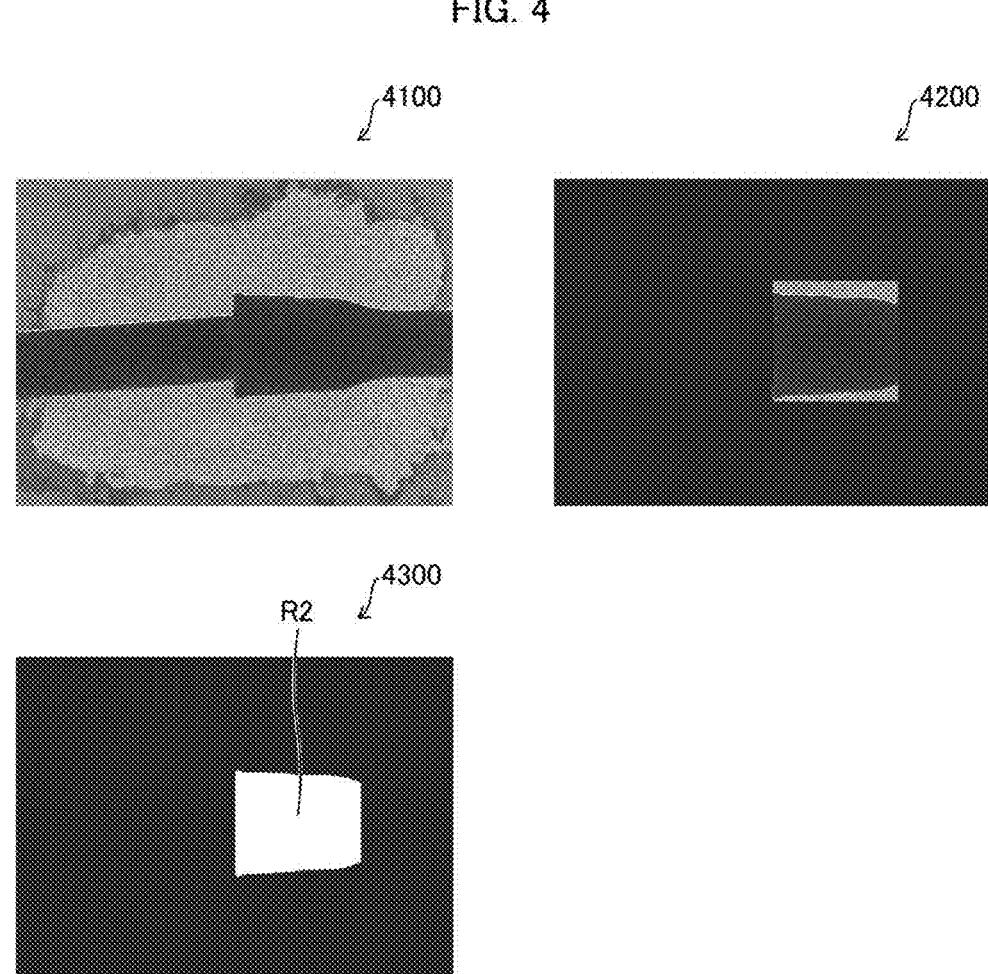
FIG. 4 is a view illustrating extraction of a contour of a second pipe by the contour extraction section.

FIG. 4 is a view illustrating extraction of the contour of the second pipe P2 by the contour extraction section 12. As in the case of the extraction of the contour of the first pipe P1, the contour extraction section 12 generates an image which is indicated by a reference sign 4100 in FIG. 4 and from which the region of the image of the first pipe P1 and the second pipe P2 has been removed from the saturation image. Subsequently, the contour extraction section 12 generates an image which is indicated by a reference sign 4200 in FIG. 4, in which only an image of a background at or near the second pipe P2 is left, and from which an unnecessary background has been removed. Moreover, the contour extraction section 12 generates an image which is indicated by a reference sign 4300 in FIG. 4 and in which only a region R2 of the second pipe P2 has been extracted. The contour extraction section 12 extracts a contour of the region R2 as the contour of the second pipe P2.

Figure 5:
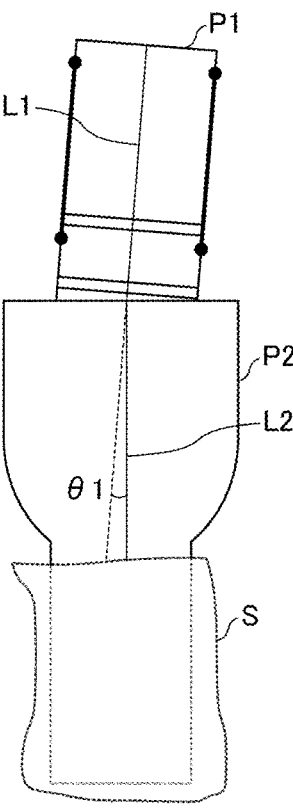
FIG. 5 is a view illustrating a first example of a bending angle calculation method in accordance with Embodiment 1.

FIG. 5 is a view illustrating a first example of a bending angle calculation method in accordance with Embodiment 1. In the example illustrated in FIG. 5, a part of the second pipe P2 which part is different from the socket is covered with a sleeve S made of polyethylene. The sleeve S is used to protect the second pipe P2. In the example illustrated in FIG. 5, the derivation section 13 derives center lines of the first pipe P1 and the second pipe P2 as respective laying direction straight lines L1 and L2 in accordance with the contours of the first pipe P1 and the second pipe P2. The calculation section 14 calculates the crossing angle θ1 between the laying direction straight lines L1 and L2 as the bending angle at the joint between the first pipe P1 and the second pipe P2.

Figure 6:
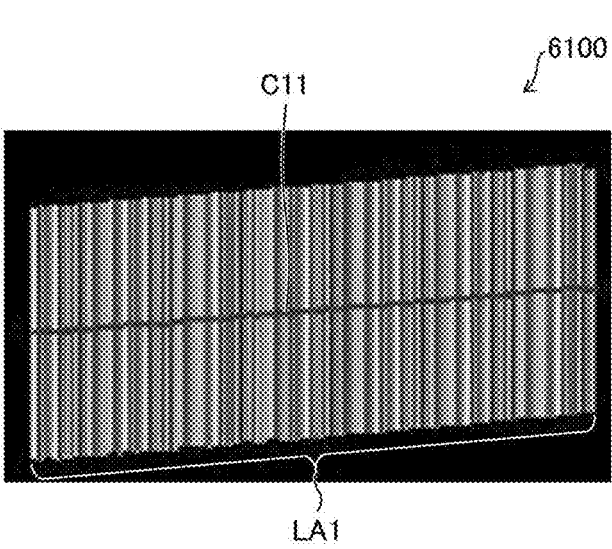
FIG. 6 is a view for describing derivation of a laying direction straight line of the first pipe by a derivation section.
Figure 6:
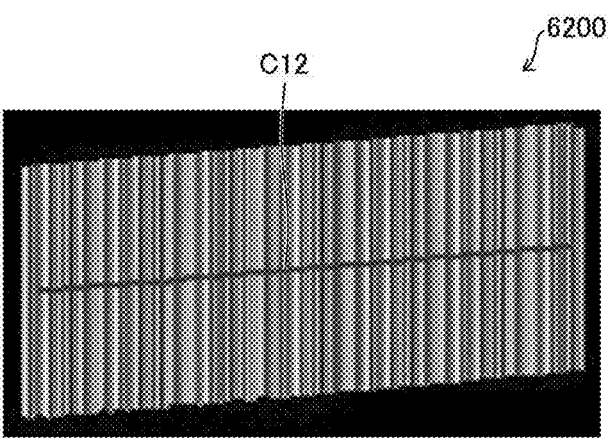

FIG. 6 is a view for describing derivation of the laying direction straight line of the first pipe P1 by the derivation section 13. First, the derivation section 13 defines a plurality of straight lines LA1 that cross a contour of a side surface of the first pipe P1 at two points. Next, as indicated by a reference sign 6100 in FIG. 6, for each of the plurality of straight lines LA1, the derivation section 13 derives intermediate points between the two points at which the plurality of straight lines LA1 cross the contour of the side surface of the first pipe P1, and derives an approximate intermediate line C11 obtained by approximating a set of the intermediate points. Furthermore, as indicated by a reference sign 6200 in FIG. 6, the derivation section 13 derives, as the laying direction straight line L1, a straight line C12 obtained by approximating a set of the intermediate points that are present within a predetermined distance from the approximate intermediate line C11. The predetermined distance may be set as appropriate by a designer of the calculation system 1.

Figure 7:
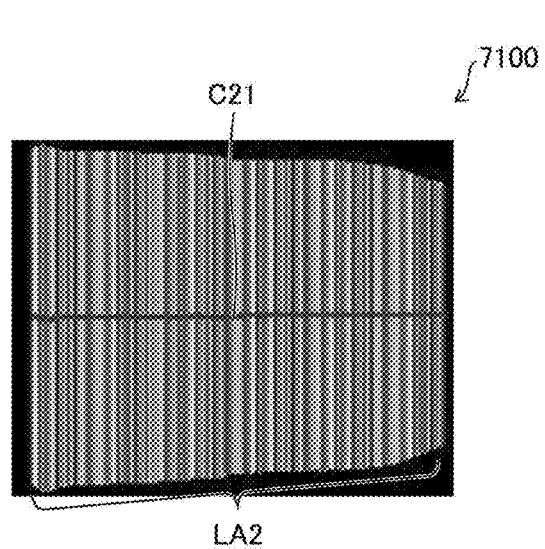
FIG. 7 is a view for describing derivation of a laying direction straight line of the second pipe by the derivation section.
Figure 7:
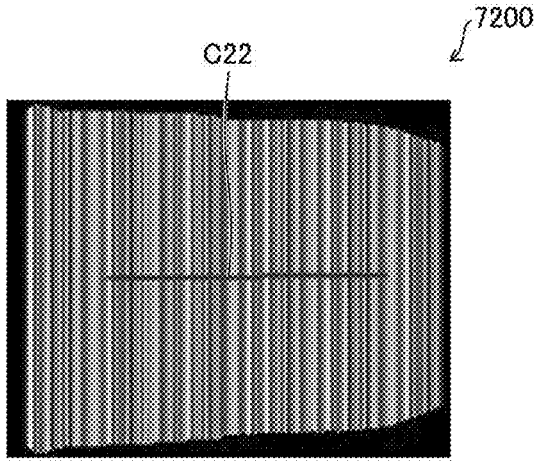

FIG. 7 is a view for describing derivation of the laying direction straight line of the second pipe P2 by the derivation section 13. First, the derivation section 13 defines a plurality of straight lines LA2 that cross a contour of a side surface of the second pipe P2 at two points. Next, as indicated by a reference sign 7100 in FIG. 7, for each of the plurality of straight lines LA2, the derivation section 13 derives intermediate points between the two points at which the plurality of straight lines LA2 cross the contour of the side surface of the second pipe P2, and derives an approximate intermediate line C21 obtained by approximating a set of the intermediate points. Furthermore, as indicated by a reference sign 7200 in FIG. 7, the derivation section 13 derives, as the laying direction straight line L2, a straight line C22 obtained by approximating a set of the intermediate points that are present within a predetermined distance from the approximate intermediate line C21. The predetermined distance may be set as appropriate by a designer of the calculation system 1. In addition, the predetermined distance in the case where the straight line C22 is derived from the approximate intermediate line C21 may be the same as or different from the predetermined distance in the case where the straight line C12 is derived from the approximate intermediate line C11.

In the example illustrated in FIG. 7, before extracting the contours of the first pipe P1 and the second pipe P2, the contour extraction section 12 can generate (i) a saturation image (first component image) indicative of saturation (a first component) of the image acquired by the second component image 11 and (ii) a lightness image (second component image) indicative of lightness (a second component) of the image acquired by the image acquisition section 11 (an image generation step). In this case, the contour extraction section 12 extracts the contours of the first pipe P1 and the second pipe P2 in each of the saturation image and the lightness image. The derivation section 13 derives the approximate intermediate lines C11 and C12 in accordance with the contours of the first pipe P1 and the second pipe P2 in each of the saturation image and the lightness image. Furthermore, the derivation section 13 derives the laying direction straight line in accordance with the contour that is extracted from one of the saturation image and the lightness image in which one more intermediate points are present within a predetermined distance from the approximate intermediate line C11 or C12.

In this case, the derivation section 13 derives the laying direction straight line in accordance with the contour of the pipe which contour is extracted from one of the saturation image and the lightness image which one is less affected by, for example, noise. This makes it possible to achieve a more accurate laying direction straight line.

In the image generation step, the contour extraction section 12 can generate, instead of either the saturation image or the lightness image, or in addition to the saturation image and the lightness image, a hue image indicative of hue of the image acquired by the image acquisition section 11. Alternatively, in the image generation step, the contour extraction section 12 can generate, instead of either the saturation image or the lightness image, or of both the saturation image and the lightness image, an image of (i) an R component, a G component, and a B component of the image acquired by the image acquisition section 11, or (ii) a component obtained by combining the R component, the G component, and the B component.

Figure 8:
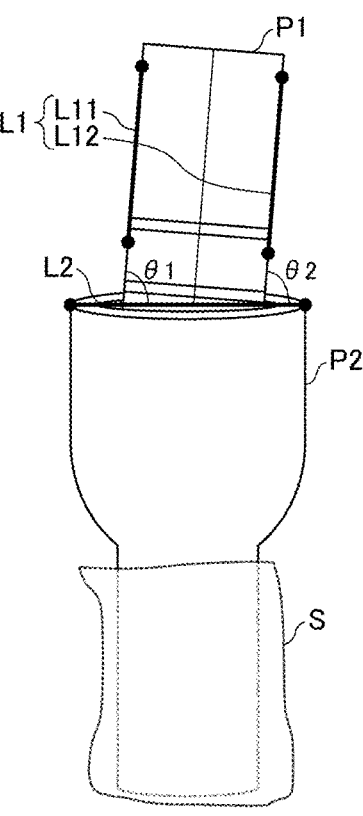
FIG. 8 is a view illustrating a second example of the bending angle calculation method in accordance with Embodiment 1.

FIG. 8 is a view illustrating a second example of the bending angle calculation method in accordance with Embodiment 1. In the example illustrated in FIG. 8, the derivation section 13 derives, as the laying direction straight line L1 of the first pipe P1, laying direction straight lines L11 and L12 each indicative of the side surface of the first pipe P1. Furthermore, in accordance with the contour P2 of the second pipe, the derivation section 13 derives, as the second laying direction straight line L2 of the second pipe P2, a straight line orthogonal to a laying direction of the second pipe P2. For example, the derivation section 13 derives, as the laying direction straight line L2 of the second pipe P2, a major axis of an ellipse represented on the end surface of the second pipe P2. The calculation section 14 calculates, as the bending angle at the joint between the first pipe P1 and the second pipe P2, one or both of (i) an angle obtained by subtracting the crossing angle θ1 between the laying direction straight lines L11 and L2 from 90° and (ii) an angle obtained by subtracting a crossing angle θ2 between the laying direction straight lines L12 and L2 from 90°.

In a case where both the crossing angles are calculated, the two crossing angles may differ from each other in magnitude due to an influence of, for example, noise. In this case, when the larger crossing angle is within a permissible range, the smaller crossing angle is also within a permissible range. Therefore, the calculation section 14 only needs to output the larger crossing angle as a final bending angle in view of safety.

Figure 9:
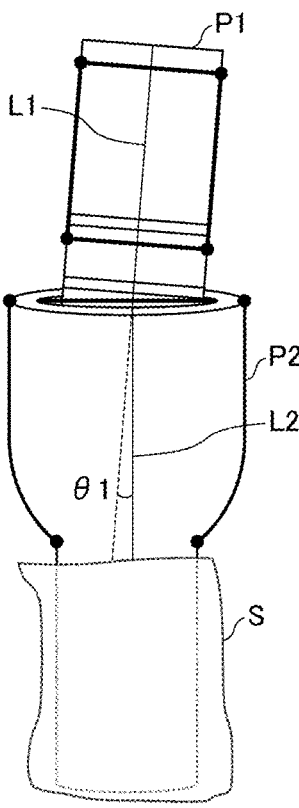
FIG. 9 is a view illustrating a third example of the bending angle calculation method in accordance with Embodiment 1.

FIG. 9 is a view illustrating a third example of the bending angle calculation method in accordance with Embodiment 1. In the example illustrated in FIG. 9, in accordance with prestored shapes of the first pipe P1 and the second pipe P2, the derivation section 13 derives, as the laying direction straight lines, straight lines indicative of the laying directions of the first pipe P1 and the second pipe P2. Specifically, in the example illustrated in FIG. 9, (i) patterns of the shapes of the first pipe P1 and the second pipe P2 and (ii) the laying directions of the pipes in the patterns are associated with each other in advance and stored in the storage device 40. The derivation section 13 matches the contours of the first pipe P1 and the second pipe P2 with the patterns so as to derive, as the laying direction straight lines L1 and L2, the straight lines indicative of the laying directions of the first pipe P1 and the second pipe P2 in the patterns. The calculation section 14 calculates the crossing angle θ1 between the laying direction straight lines L1 and L2 as the bending angle at the joint between the first pipe P1 and the second pipe P2.

Figure 10:
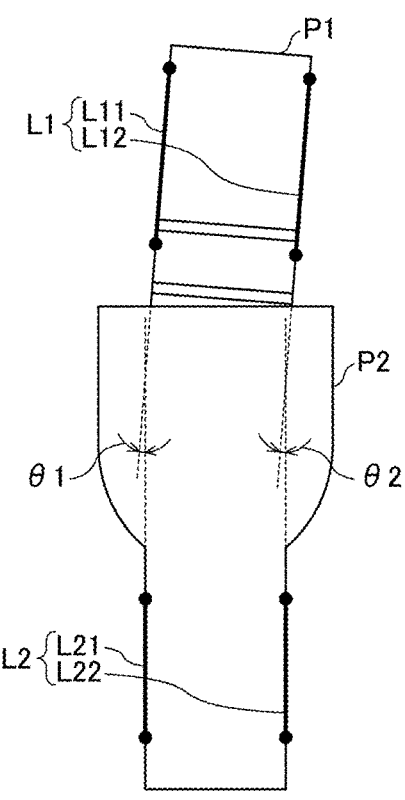
FIG. 10 is a view illustrating a fourth example of the bending angle calculation method in accordance with Embodiment 1.

FIG. 10 is a view illustrating a fourth example of the bending angle calculation method in accordance with Embodiment 1. In the example illustrated in FIG. 10, the sleeve S (see, for example, FIG. 5) of the second pipe P2 has been removed, and a cylindrical region facing away from the first pipe P1 with respect to the socket is exposed. The derivation section 13 derives, as the laying direction straight line L2 of the second pipe P2, laying direction straight lines L21 and L22 each indicative of a side surface of the region.

Furthermore, the derivation section 13 derives the laying direction straight line L1 of the first pipe P1 as in the case of the example illustrated in FIG. 5. The calculation section 14 calculates, as the bending angle at the joint between the first pipe P1 and the second pipe P2, (i) a single predetermined combination of crossing angles (e.g., the crossing angle θ1 between the laying direction straight lines L11 and L21 or the crossing angle θ2 between the laying direction straight lines L12 and L22) or (ii) a plurality of combinations of crossing angles. In order to calculate the plurality of combinations of crossing angles, the calculation section 14 only needs to set the greatest one of the plurality of crossing angles as the bending angle at the joint between the first pipe P1 and the second pipe P2.

As in the case of the example illustrated in FIG. 5, the examples illustrated in FIGS. 8 to 10 also make it possible to calculate the bending angle at the joint between the first pipe P1 and the second pipe P2. The first pipe P1 and the second pipe P2 are each a straight pipe in the examples illustrated in FIGS. 5 and 8 to 10. Note, however, that the first pipe P1 and the second pipe P2 each can be, for example, a specially shaped pipe such as a T pipe or a bent pipe, or a valve.

In a case where the bending angle is calculated by any one of the methods described earlier, the image is preferably captured in the image capturing step in a state in which a derivation assisting tool is attached to each of the first pipe P1 and the second pipe P2. In this case, the derivation section 13 derives the laying direction straight line in accordance with the image of the derivation assisting tool in the derivation step. The following description will discuss an example of the derivation assisting tool.

Figure 11:
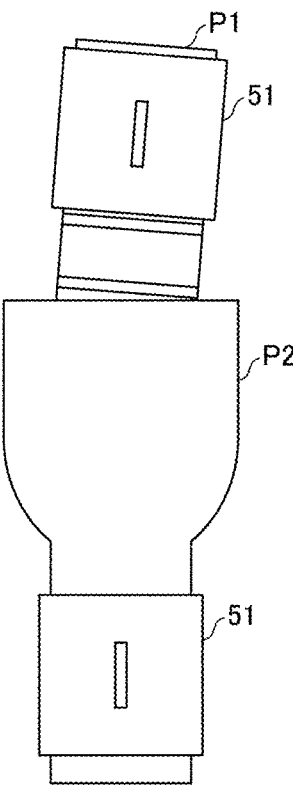
FIG. 11 is a view illustrating a state in which a derivation assisting tool is attached to each of the first pipe and the second pipe.

FIG. 11 is a view illustrating a state in which a derivation assisting tool 51 is attached to each of the first pipe P1 and the second pipe P2. The derivation assisting tool 51 has a shape obtained by cutting, along a plane passing through a central axis of each of the first pipe P1 and the second pipe P2, a tube that can be attached to the outside of each of the first pipe P1 and the second pipe P2. The derivation assisting tool 51 can be made of a material that is not particularly limited and is, for example, metal or resin. The derivation assisting tool 51 is colored in a color different from that of the first pipe P1 and the second pipe P2.

In a case where contrast between (a) the color of the first pipe P1 and the second pipe P2 and (b) a color of the background is low, the image is preferably captured in a state in which the derivation assisting tool 51 is attached to each of the first pipe P1 and the second pipe P2. In this case, since contrast between the derivation assisting tool 51 and the background becomes high, a contour of an image of the derivation assisting tool 51 can be easily extracted from the captured image. This allows the derivation section 13 to easily derive the laying direction straight line in accordance with the extracted contour.

Figure 12:
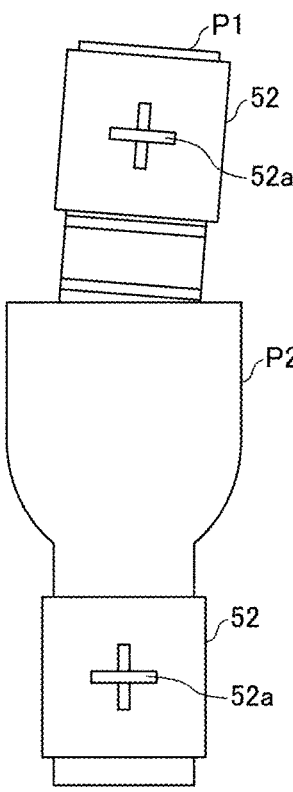
FIG. 12 is a view illustrating a state in which a derivation assisting tool is attached to each of the first pipe and the second pipe.

FIG. 12 is a view illustrating a state in which a derivation assisting tool 52 is attached to each of the first pipe P1 and the second pipe P2. The derivation assisting tool 52 has a shape of a part of a tube that can be attached to the outside of each of the first pipe P1 and the second pipe P2. Further, the derivation assisting tool 52 has a surface that is provided with a light source 52a having a shape in which (i) a line segment perpendicular to an axial direction of the pipes to each of which the derivation assisting tool 52 is attached and (ii) a line segment parallel to the axial direction cross each other. The light source 52a is, for example, a plurality of light emitting diodes (LEDs) provided so as to have the above shape.

In the image capturing step, the derivation section 13 can easily derive the laying direction straight line in accordance with the shape of the light source 52a by capturing the image in a state in which the derivation assisting tool 52 is attached to each of the first pipe P1 and the second pipe P2. Furthermore, the derivation section 13 can derive the derivation laying direction straight line in accordance with a contour of the derivation assisting tool 52 as in the case of using the derivation assisting tool 51.

Figure 13:
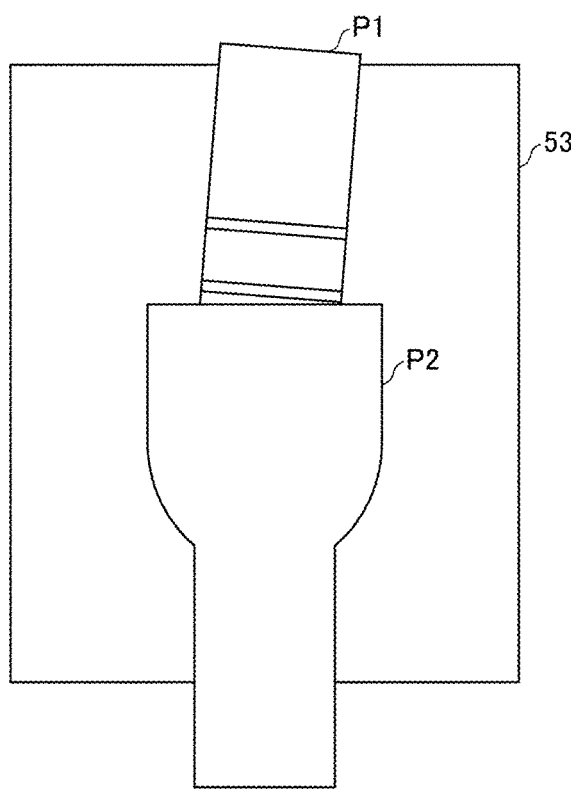
FIG. 13 is a view illustrating a state in which a derivation assisting tool is provided as a background of the first pipe and the second pipe.

FIG. 13 is a view illustrating a state in which a derivation assisting tool 53 is provided as a background of the first pipe P1 and the second pipe P2. The derivation assisting tool is not necessarily limited to that attached to each of the first pipe P1 and the second pipe P2. The derivation assisting tool 53 is, for example, paper or a flat plate colored in a color (e.g., red) different from that of the first pipe P1 and the second pipe P2, or a surface-emitting backlight. By capturing an image of the first pipe P1 and the second pipe P2 to each of which the derivation assisting tool 53 is provided, a boundary between (a) the first pipe P1 and the second pipe P2 and (b) the background in the image is made clear. This makes it easy to extract the contour and derive the laying direction straight line.

As described above, the arithmetic apparatus 10 makes it possible to calculate the bending angle at the joint between the first pipe P1 and the second pipe P2 in accordance with the image of the first pipe P1 and the second pipe P2, the image having been captured by the camera 20. This saves a worker time and effort to calculate the bending angle.

Embodiment 2

The following description will discuss another embodiment of the present invention. Note that for convenience, members having functions identical to those of the respective members described in Embodiment 1 are given respective identical reference numerals, and a description of those members is omitted.

Figure 14:
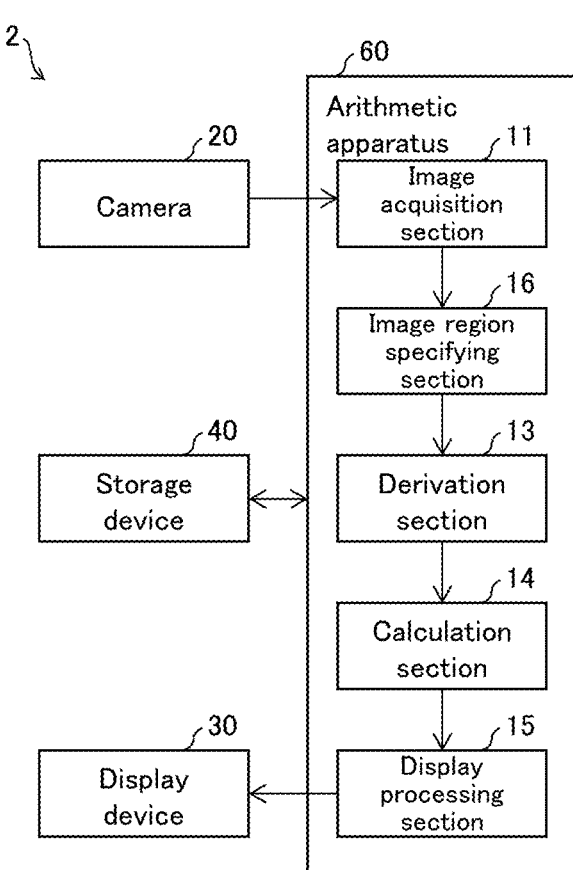
FIG. 14 is a block diagram illustrating a configuration of a main part of a calculation system in accordance with Embodiment 2.

FIG. 14 is a block diagram illustrating a configuration of a main part of a bending angle calculation system 2 in accordance with Embodiment 2 (hereinafter simply referred to as a "calculation system 2"). The calculation system 2 differs from the calculation system 1 in that the calculation system 2 includes an arithmetic apparatus 60 instead of the arithmetic apparatus 10. The arithmetic apparatus 60 differs from the arithmetic apparatus 10 in that the arithmetic apparatus 60 includes an image region specifying section 16 instead of the contour extraction section 12.

The image region specifying section 16 specifies a region on an image which region is used by a derivation section 13 to derive a laying direction straight line. The image region specifying section 16 specifies the region by, for example, matching with a pattern of a shape of a pipe, the pattern being stored in a storage device 40 in advance. The derivation section 13 derives a laying direction straight line in a three-dimensional space in accordance with the image region specified by the image region specifying section 16.

Figure 15:
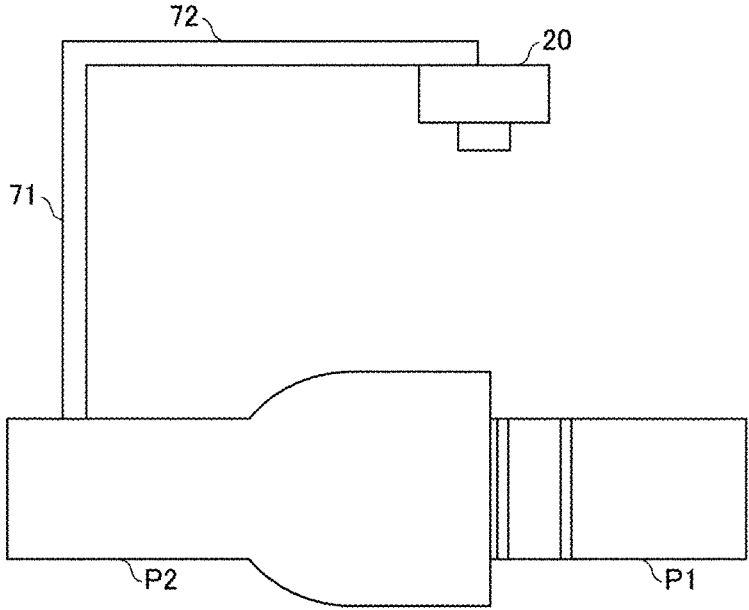
FIG. 15 is a view illustrating an example of an image capturing method carried out by a camera in Embodiment 2.

FIG. 15 is a view illustrating an example of an image capturing method carried out by a camera 20 in Embodiment 2. In the example illustrated in FIG. 15, the second pipe P2 is provided with a supporting column 71 that stands upright in a direction perpendicular to an axis of the second pipe P2. Furthermore, a horizontal arm 72 extends from the supporting column 71 in the direction horizontal to the axis of the second pipe P2. The camera 20 is provided in a part of the horizontal arm 72 which part faces a joint part in which a first pipe P1 and a second pipe P2 are joined together.

The camera 20 which is thus provided causes the second pipe P2 to have a laying direction straight line that is always constant with respect to the camera 20. Thus, the derivation section 13 only needs to derive a laying direction straight line of the first pipe P1. This reduces a workload of the arithmetic apparatus 60. Note that the supporting column 71 can be alternatively provided in the first pipe P1. In this case, the horizontal arm 72 extends in a direction horizontal to an axis of the first pipe P1, so that the laying direction straight line of the first pipe P1 is always constant with respect to the camera 20.

Figure 16:
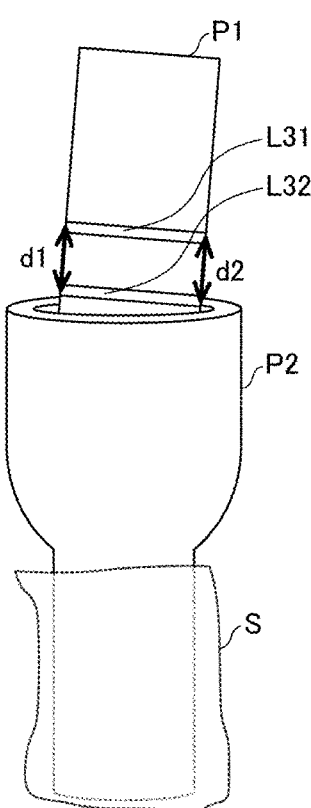
FIG. 16 is a view illustrating a first example of a bending angle calculation method in accordance with Embodiment 2.

FIG. 16 is a view illustrating a first example of a bending angle calculation method in accordance with Embodiment 2. In the example illustrated in FIG. 16, two straight lines L31 and L32 that extend in a circumferential direction and are parallel to each other are shown on the first pipe P1. The straight lines L31 and L32 can be drawn directly on the first pipe P1 with, for example, luminous paint, or can be shown by luminous tape that is linearly attached to the first pipe P1.

The image region specifying section 16 specifies a region of an image of the first pipe P1 and the second pipe which region includes an image of the straight lines L31 and L32 which image includes P2. The derivation section 13 derives the laying direction straight line of the first pipe P1 in accordance with a distance between the straight lines L31 and L32 in the image. Note, however, that the derivation section 13 derives the laying direction straight line of the second pipe P2 in a case where the straight lines L31 and L32 are shown in the second pipe P2.

Specifically, the derivation section 13 calculates the distances between the straight lines L31 and L32 at a plurality of positions. Examples of the distances at the plurality of positions include distances d1 and d2 at both ends in a width direction of the first pipe P1. A relative relationship between the distances at the plurality of positions depends on a laying direction of the first pipe P1 and a positional relationship between the camera 20 and the first pipe P1. This allows the derivation section 13 to use (i) the relative relationship between the distances between the straight lines L31 and L32 at the plurality of positions and (ii) the positional relationship between the camera 20 and the first pipe P1 to derive the laying direction straight line of the first pipe P1.

Figure 17:
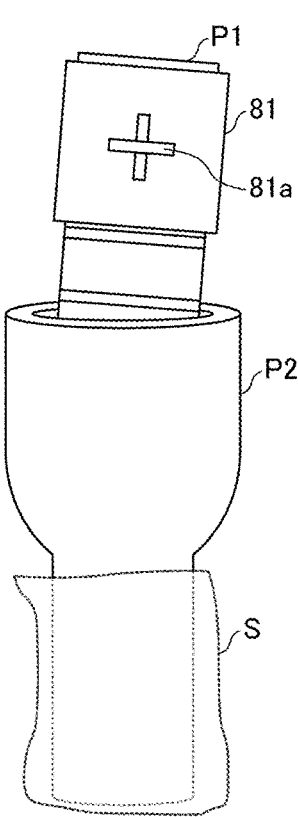
FIG. 17 is a view illustrating a second example of the bending angle calculation method in accordance with Embodiment 2.

FIG. 17 is a view illustrating a second example of the bending angle calculation method in accordance with Embodiment 2. In the example illustrated in FIG. 17, the first pipe P1 is provided with a calculation jig 81. The calculation jig 81 has a shape extending along a surface of the first pipe P1. The calculation jig 81 has a surface provided with a light source 81a having a predetermined shape. In FIG. 17, the shape of the light source 81a is two line segments orthogonal to each other, but is not limited to such line segments. The light source 81a is, for example, a plurality of LEDs provided so as to have the above shape.

The image region specifying section 16 specifies a region of the image of the first pipe P1 and the second pipe which region includes an image of the light source 81a. The derivation section 13 derives the laying direction straight line of the first pipe P1 or the laying direction straight line of the second pipe P2 in accordance with the shape of the light source 81a in the image. Note, however, that the derivation section 13 derives the laying direction straight line of the second pipe P2 in a case where the second pipe P2 is provided with the calculation jig 81.

The shape of the light source 81a in the image depends on the laying direction of the first pipe P1 and the positional relationship between the camera 20 and the first pipe P1. This allows the derivation section 13 to use (i) the shape of the light source 81*a* and (ii) the positional relationship between the camera 20 and the first pipe P1 to derive the laying direction straight line of the first pipe P1.

Instead of the light source 81*a*, a mark that has the predetermined shape described earlier and does not self-emit light can be alternatively drawn on the surface of the calculation jig 81. Note, however, that an influence of noise in the image is reduced by using the light source 81*a* that self-emits light.

Figure 18:
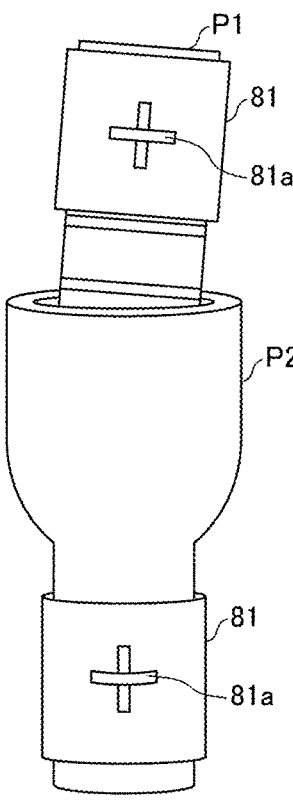
FIG. 18 is a view illustrating a variation of the second example of the bending angle calculation method in accordance with Embodiment 2.

FIG. 18 is a view illustrating a variation of the second example of the bending angle calculation method in accordance with Embodiment 2. In a case where the calculation jig 81 is used to calculate a bending angle, the camera 20 does not necessarily need to be provided as illustrated in FIG. 15. As illustrated in, for example, FIG. 18, the derivation section 13 can derive the laying direction straight line for each of the first pipe P1 and the second pipe P2 by providing not only the first pipe P1 but also the second pipe P2 with the calculation jig 81.

Figure 19:
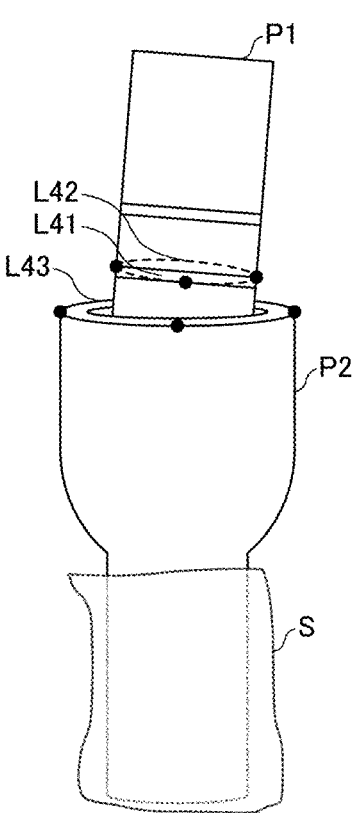
FIG. 19 is a view illustrating a third example of the bending angle calculation method in accordance with Embodiment 2.

FIG. 19 is a view illustrating a third example of the bending angle calculation method of Embodiment 2. In the example illustrated in FIG. 19, a straight line L41 that extends in the circumferential direction is shown on the first pipe P1. The straight line L41 can be shown by luminous paint or luminous tape as in the case of the straight lines L31 and L32. For simplification, an image of the straight line L41 is shown by a straight line in FIG. 19. However, in accordance with a positional relationship between the camera 20 and the straight line L41, the image of the straight line L41 in an actually captured image of the first pipe P1 is a curve, which is a part of an ellipse L42.

The image region specifying section 16 specifies a region of the image of the first pipe P1 and the second pipe which region includes the image of the straight line L41. The derivation section 13 derives the laying direction straight line of the first pipe P1 in accordance with a shape of the ellipse L42, the ellipse L42 containing the straight line L41 in the image. Note, however, that the derivation section 13 derives the laying direction straight line of the second pipe P2 in a case where the straight line L41 is shown in the second pipe P2.

The derivation section 13 specifies the ellipse L42 by three points in total, which are both ends of the image of the straight line L41 and one point between the both ends. The ellipse L42 has a minor axis having a length that depends on (i) the laying direction of the first pipe P1 in a direction perpendicular to a plane of the image and (ii) the positional relationship between the camera 20 and the first pipe P1. The ellipse L42 has a major axis having a direction that depends on (i) the laying direction of the first pipe P1 in a direction parallel to the plane of the image and (ii) the positional relationship between the camera 20 and the first pipe P1. Thus, the derivation section 13 derives, as a laying direction straight line orthogonal to the laying direction of the first pipe P1 on a plane parallel to the image, the straight line including the major axis of the ellipse L42. Furthermore, the derivation section 13 can derive, from a length ratio between the minor axis and the major axis of the ellipse L42, a laying direction straight line parallel to the laying direction of the first pipe P1 on a plane perpendicular to the image. In this case, the calculation section 14 calculates a bending angle for each of the plane parallel to the image and the plane perpendicular to the image.

In a case where the method illustrated in FIG. 19 is used, the camera 20 does not necessarily need to be provided as illustrated in FIG. 15. The camera 20 that is not provided as illustrated in FIG. 15 captures an image in a state in which luminous paint or luminous tape is attached to, for example, an end surface or an end of the second pipe P2, and the camera 20 is provided so as to be closer to the first pipe P1 than is the end surface of the second pipe P2. In this case, the image captured by the camera 20 includes an image of the end surface or the end of the second pipe P2. In accordance with a shape of an ellipse L43 including the end surface or the end, the derivation section 13 can derive the laying direction straight line of the second pipe P2 on each of the plane parallel to the image and the plane perpendicular to the image.

Figure 20:
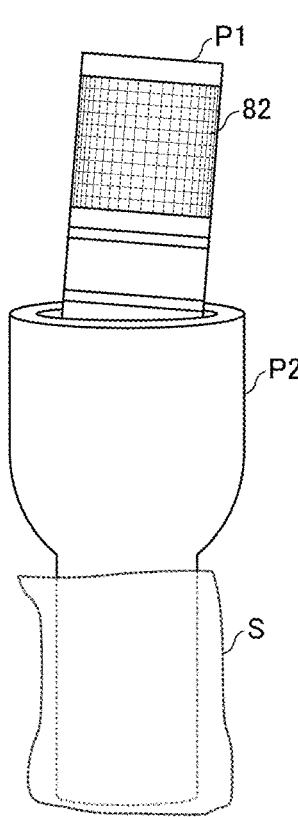
FIG. 20 is a view illustrating a fourth example of the bending angle calculation method in accordance with Embodiment 2.

FIG. 20 is a view illustrating a fourth example of the bending angle calculation method of Embodiment 2. In the example illustrated in FIG. 20, the first pipe P1 is provided with a sheet 82 on which a predetermined pattern is drawn. The sheet can be made of a material that is not particularly limited and is, for example, paper or resin. In the example illustrated in FIG. 20, the pattern drawn on the sheet 82 is a lattice pattern, but is not limited to the lattice pattern. Alternatively, the pattern can be drawn directly on the first pipe P1.

The image region specifying section 16 specifies a region of the image of the first pipe P1 and the second pipe which region includes an image of the sheet 82. The derivation section 13 derives the laying direction straight line of the first pipe P1 in accordance with a shape of the pattern in the image. Note, however, that the derivation section 13 derives the laying direction straight line of the second pipe P2 in a case where the second pipe P2 is provided with the sheet 82.

The shape of the pattern in the image, which pattern is drawn on the sheet 82, depends on the laying direction of the first pipe P1 and the positional relationship between the camera 20 and the first pipe P1. This allows the derivation section 13 to use (i) the shape of the pattern drawn on the sheet 82 and (ii) the positional relationship between the camera 20 and the first pipe P1 to derive the laying direction straight line of the first pipe P1.

Note that the sheet 82 can be obtained by drawing a three-dimensional lattice on a light-transmissive sheet. In this case, the derivation section 13 can easily derive the laying direction straight line of the first pipe P1 in accordance with a shape of the three-dimensional lattice in the image, in particular, a lattice interval in a direction perpendicular to the surface of the first pipe P1.

Figure 21:
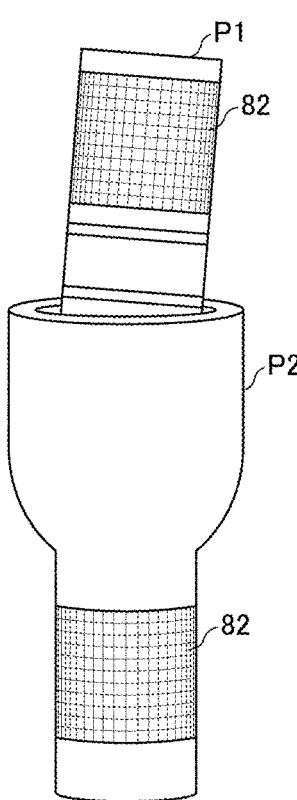
FIG. 21 is a view illustrating a variation of the fourth example of the bending angle calculation method in accordance with Embodiment 2.

FIG. 21 is a view illustrating a variation of the fourth example of the bending angle calculation method in accordance with Embodiment 2. In a case where the sheet 82 is used to calculate a bending angle, the camera 20 does not necessarily need to be provided as illustrated in FIG. 15. As illustrated in, for example, FIG. 21, the derivation section 13 can derive the laying direction straight line in the three-dimensional space for each of the first pipe P1 and the second pipe P2 by providing not only the first pipe P1 but also the second pipe P2 with the sheet 82. With the configuration, the calculation section 14 can calculate the bending angle in accordance with the respective laying direction straight lines of the first pipe P1 and the second pipe P2 even in a case where the camera 20 is not positionally fixed.

As described above, the arithmetic apparatus 60 makes it possible to three-dimensionally calculate the bending angle for the first pipe P1 and the second pipe P2. Therefore, the arithmetic apparatus 60 makes it possible to further save a worker time and effort.

Embodiment 3

The following description will discuss a further embodiment of the present invention.

Figure 22:
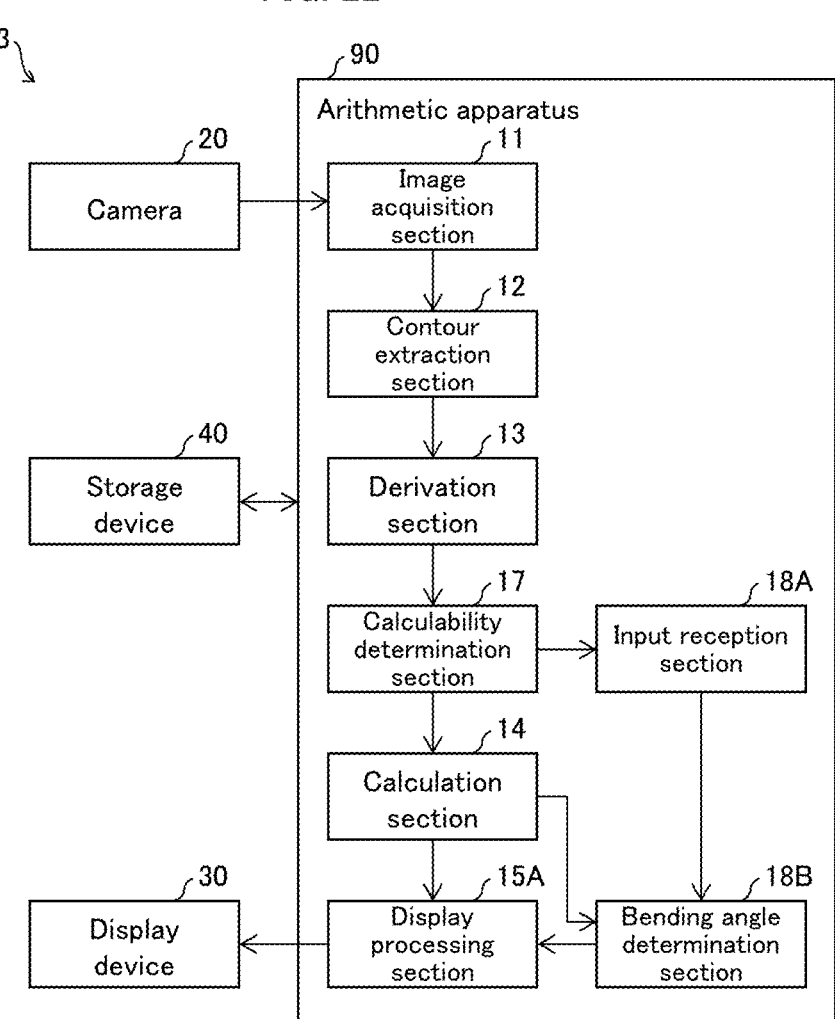
FIG. 22 is a block diagram illustrating a configuration of a main part of a bending angle determination system in accordance with Embodiment 3.

FIG. 22 is a block diagram illustrating a configuration of a main part of a bending angle determination system 3 in accordance with Embodiment 3 (hereinafter simply referred to as "determination system 3"). The determination system 3 differs from the calculation system 1 in that the determination system 3 includes an arithmetic apparatus 90 (bending angle determination apparatus) instead of the arithmetic apparatus 10. The arithmetic apparatus 90 includes a calculability determination section 17, an input reception section 18A, and a bending angle determination section 18B, in addition to the configuration of the arithmetic apparatus 10.

The calculability determination section 17 carries out a calculability determination step of determining whether the bending angle at the joint between the first pipe P1 and the second pipe P2 is calculable on the basis of the laying direction straight lines derived by the derivation section 13. For example, the calculability determination section 17 calculates the lengths of the laying direction straight lines, and in a case where the lengths are each less than a predetermined threshold, the calculability determination section 17 determines that the bending angle is not calculable. The predetermined threshold may be set as appropriate by a designer of the determination system 3.

Figure 23:
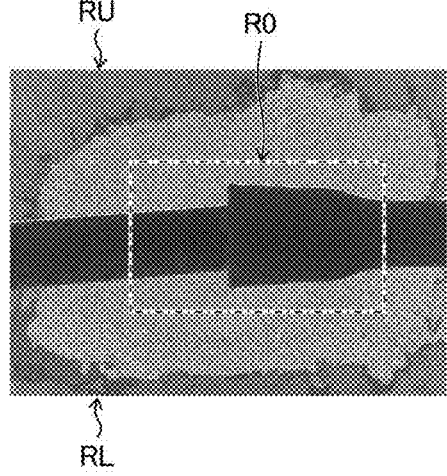
FIG. 23 is a view for describing another example of a process carried out by a calculability determination section.

FIG. 23 is a view for describing another example of a process carried out by the calculability determination section 17. In a case where the image acquisition section 11 has normally acquired an image, the region R1 (see FIG. 3) of the first pipe P1 and the region R2 (see FIG. 4) of the second pipe P2 appear inside a region R0 shown in FIG. 23. In a case where at least a portion of the regions R1 and R2 is present outside a predetermined range, the calculability determination section 17 can determine that the bending angle is not calculable. For example, when at least a portion of the regions R1 or R2 is present in a region in the vicinity of an upper end RU or a lower end RL of an image shown in FIG. 23, the calculability determination section 17 determines that the bending angle is not calculable. That is, the region in the vicinity of the upper end RU or the lower end RL may be regarded as being outside the predetermined range described earlier.

The input reception section 18A carries out an input reception step of receiving inputs of respective parameters of a plurality of predetermined positions set in the circumferential direction of the first pipe P1, the parameters each indicating a degree to which the first pipe P1 is inserted into the second pipe P2. The parameters are inputted by a user through an input device such as, for example, a touch panel or a keyboard which is not illustrated. The parameters are, for example, each a distance, in a direction parallel to an axial direction of the first pipe P1, between the line L32 drawn on the surface of the first pipe P1 (see FIG. 16) and the end surface of the socket of the second pipe P2.

Figure 24:
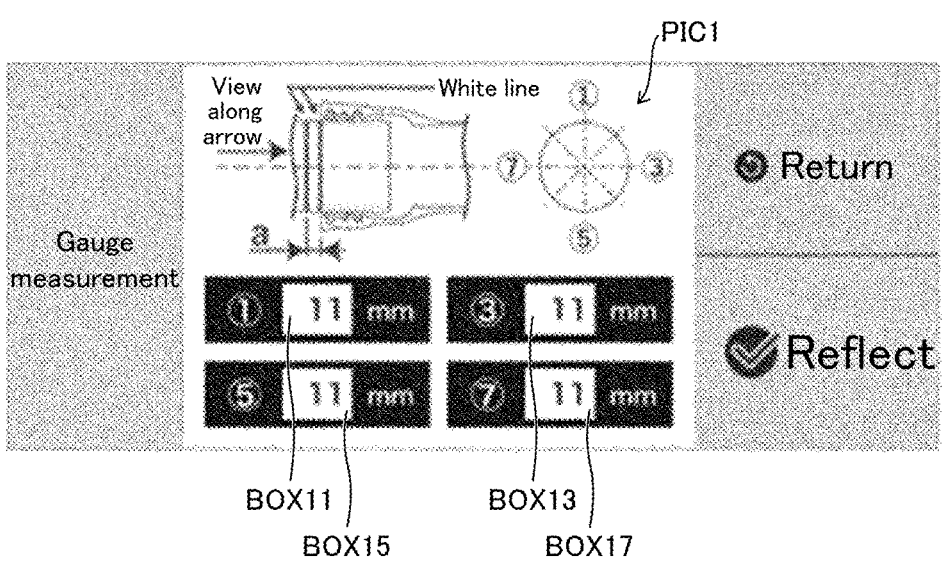
FIG. 24 is a view showing an example of an image that the display device is caused to display in a case where an input reception section in accordance with Embodiment 3 receives inputs of parameters.

FIG. 24 is a view showing an example of an image that the input reception section 18A causes the display device 30 to display in a case where the input reception section 18A receives the inputs of the parameters. The image shown in FIG. 24 includes an image PIC1 showing four points equally-spaced in the circumferential direction of the first pipe P1 and includes entry boxes BOX11, BOX13, BOX15, and BOX17 for receiving respective parameters corresponding to the four points. The user measures the above-described distance at each of the four points shown in the image PIC1 and inputs the respective distances into the entry boxes BOX11, BOX13, BOX15 and BOX17. The input reception section 18A receives, as inputs of the parameters, the inputs of the respective distances into the entry boxes BOX11, BOX13, BOX15, and BOX17.

The bending angle determination section 18B carries out a bending angle determination step of determining whether the bending angle at the joint at which the first pipe P1 and the second pipe P2 are joined together is appropriate. In a case where the calculability determination section 17 has determined that the bending angle is calculable on the basis of the laying direction straight lines, the bending angle determination section 18B determines whether the bending angle calculated by the calculation section 14 is appropriate.

In a case where the calculability determination section 17 has determined that the bending angle is not calculable on the basis of the laying direction straight lines, the bending angle determination section 18B determines whether the bending angle at the joint is appropriate, on the basis of the parameters that have been inputted into and received by the input reception section 18A. For example, the bending angle determination section 18B calculate differences between the parameters at two opposing points, and in a case where each of the absolute values of the differences is equal to or less than a predetermined threshold, the bending angle determination section 18B determines that the bending angle is appropriate. The predetermined value can be, for example, an upper limit value of the absolute value of the difference between the parameters in a case where the bending angle is appropriate.

In an example shown in FIG. 24, the parameters are inputted for the four points equally-spaced in the circumferential direction of the first pipe P1. These four points can be divided into a pair of two points that are opposing in the horizontal direction and a pair of two points that are opposing in the vertical direction. The bending angle determination section 18B calculates the absolute value of the difference between the parameters, for each of these pairs. Thereafter, in a case where each of the calculated absolute values of the differences of the parameters is equal to or less than the predetermined threshold, the bending angle determination section 18B determines that the bending angle is appropriate.

A display processing section 15A causes the display device 30 to display a result of calculation of the bending angle carried out by the calculation section 14. In addition, the display processing section 15A causes the display device 30 to also display a result of the determination carried out by the bending angle determination section 18B.

Figure 25:
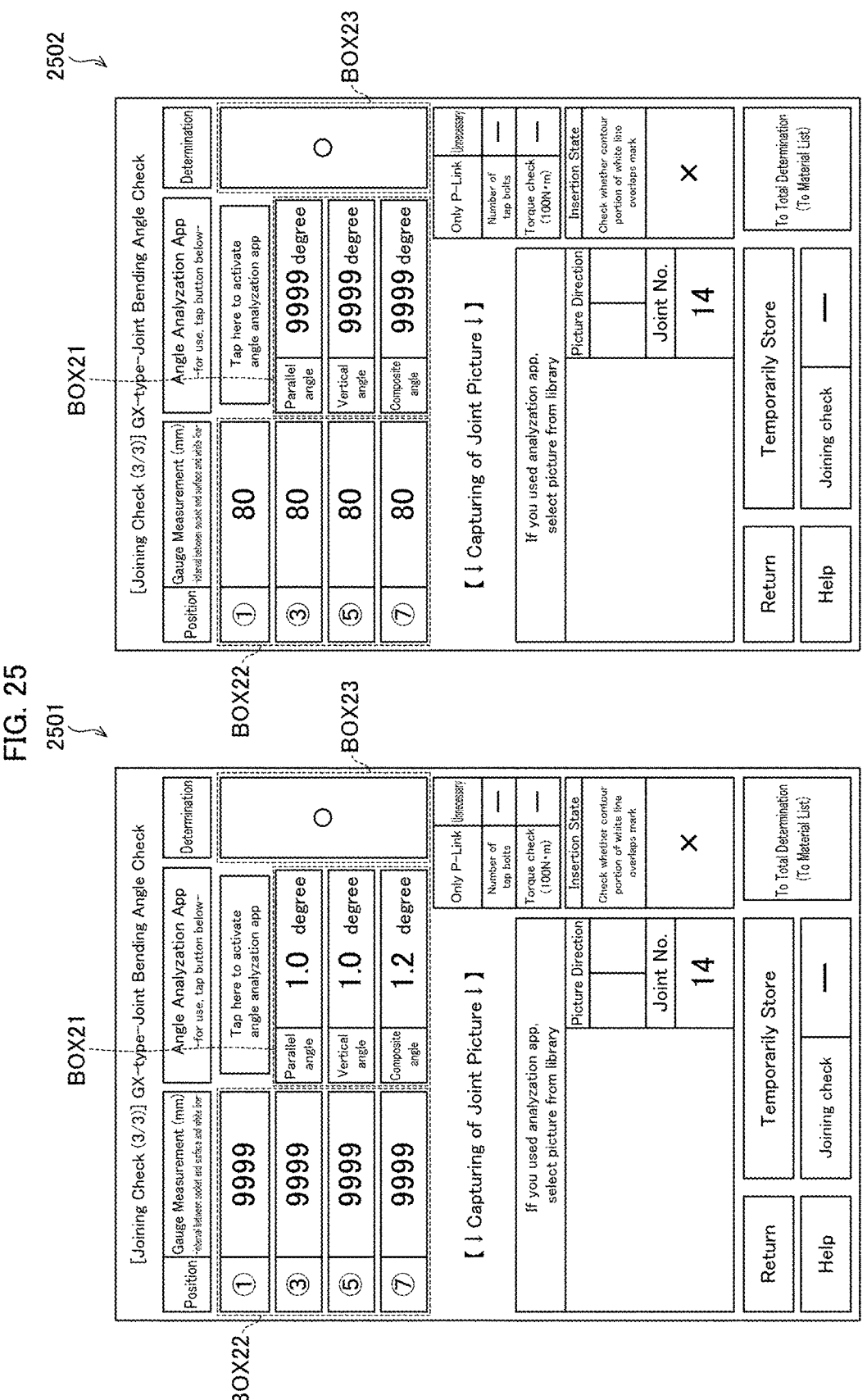
FIG. 25 is a view showing examples of an image that a display processing section in accordance with Embodiment 3 causes the display device to display.

FIG. 25 is a view showing examples of an image that the display processing section 15A causes the display device 30 to display. In FIG. 25, a reference sign 2501 refers to an example of a display in a case where the calculability determination section 17 has determined that the bending angle is calculable on the basis of the laying direction straight lines. Further, a reference sign 2502 refers to an example of a display in a case where the calculability determination section 17 has determined that the bending angle is not calculable on the basis of the laying direction straight lines.

The image that the display processing section 15A causes the display device 30 to display includes display boxes BOX21, BOX22, and BOX23. The display box BOX21 is a box for displaying the result of the calculation of the bending angle carried out by the calculation section 14. The display box BOX22 is a box for displaying the parameters that have been inputted into and received by the input reception section 18A. The display box BOX23 is a box for displaying the result of the determination carried out by the bending angle determination section 18B. For example, in a case where the bending angle determination section 18B has determined that the bending angle is appropriate, the display box BOX23 displays a symbol "o". In a case where the bending angle determination section 18B has determined that the bending angle is not appropriate, the display box BOX23 displays a symbol "x". Note, however, that the indications displayed in the display box BOX23 are not limited to these symbols, and the determination result can be displayed in form of text.

In the example referred to by the reference sign 2501, the display box BOX21 displays the bending angle calculated by the calculation section 14. Meanwhile, since the input reception section 18A has not received inputs of the parameters, the display box BOX22 displays values that cannot be parameters ("9999" in the image of the reference sign 2501). In addition, the display box BOX23 displays the result of the determination carried out by the bending angle determination section 18B on the basis of the bending angle calculated by the calculation section 14.

In the example referred to by the reference sign 2502, since the calculation section 14 has not been able to calculate the bending angle, the display box BOX21 displays values that cannot be bending angles ("9999" in the image of the reference sign 2502). Meanwhile, the display box BOX22 displays the parameters that have been inputted into and received by the input reception section 18A. In addition, the display box BOX23 displays the result of the determination carried out by the bending angle determination section 18B on the basis of the parameters inputted.

As such, the arithmetic apparatus 90 receives the inputs of the parameters measured by the user and determines whether the bending angle is appropriate, on the basis of the parameters. This enables accurate determination as to the bending angle.

In particular, in a case where the arithmetic apparatus 90 determines, in the calculability determination step, that the bending angle is not calculable, the arithmetic apparatus 90 carries out the input reception step and the bending angle determination step. That is, in a case where the bending angle is calculable on the basis of the laying direction straight lines, it is unnecessary to input the parameters. Therefore, the arithmetic apparatus 90 save a user time and effort.

Alternatively, even in a case where the bending angle is calculable on the basis of the laying direction straight lines, the arithmetic apparatus 90 can receive the parameters and determine whether the bending angle is appropriate, on the basis of the parameters. In such a case, it is possible to doubly determine whether the bending angle is appropriate. This enables more accurate determination.

The arithmetic apparatus 90 can further include, at a stage followed by the bending angle determination section 18B, a parameter determination section for carrying out determination as to the parameters. The parameter determination section determines whether at least one parameter is within a predetermined range (for example, 65 mm to 85 mm). In a case where all the parameters fall outside the predetermined range, the parameter determination section can cause the display device 30 to display a warning image. In this case, the arithmetic apparatus 90 can also manage, on the basis of the parameters, the degree to which the first pipe P1 is inserted into the second pipe P2.

In the example described earlier, the input reception section 18A receives the inputs of the four parameters. However, depending on a state of the joint, a situation is conceivable in which the bending angle needs to be determined only for one direction. In such a case, the input reception section 18A only needs to receive inputs of two parameters corresponding to the direction.

Embodiment 4

FIG. 26 is a block diagram illustrating a configuration of a main part of a bending angle determination system 4 in accordance with Embodiment 4 (hereinafter simply referred to as "determination system 4"). The determination system 4 differs from the determination system 3 in that the determination system 4 includes an arithmetic apparatus 90A (bending angle determination apparatus) instead of the arithmetic apparatus 90. The arithmetic apparatus 90A differs from the arithmetic apparatus 90 in (i) that the arithmetic apparatus 90A includes a display processing section 15B (auxiliary calculation result display section) instead of the display processing section 15A and (ii) that the arithmetic apparatus 90A further includes an auxiliary calculation section 18C.

The auxiliary calculation section 18C carries out an auxiliary calculation step of calculating the bending angle on the basis of the parameters inputted. For example, the auxiliary calculation section 18C calculates a bending angle $\varphi A$ in the horizontal direction and a bending angle $\varphi B$ in the vertical direction and calculates, as a final bending angle, a composite angle $\varphi C$ of the bending angle $\varphi A$ and the bending angle $\varphi B$.

Specifically, the auxiliary calculation section 18C calculates the bending angle $\varphi A$ in the horizontal direction with use of the following formula (1) on the basis of (i) an absolute value diffA of the difference between the two points that are opposing in the horizontal direction and (ii) an outer diameter dia of the first pipe P1.

$$\varphi A = \tan^{-1}(\text{diffA}/\text{dia}) \qquad (1)$$

Further, the auxiliary calculation section 18C calculates the bending angle $\varphi B$ in the vertical direction with use of the following formula (2) on the basis of (i) an absolute value diffB of the difference between the two points that are opposing in the vertical direction and (ii) the outer diameter dia of the first pipe P1.

$$\varphi B = \tan^{-1}(\text{diffB}/\text{dia}) \qquad (2)$$

Furthermore, the auxiliary calculation section 18C combines the bending angle QA and the bending angle $\varphi B$ with use of the following formula (3) to calculate the composite angle $\varphi C$, which is a final bending angle.

$$\varphi C = (\varphi A^2 + \varphi B^2)^{0.5} \qquad (3)$$

The following description assumes, as a specific example, that (i) the outer diameter dia of the first pipe P1 is 93 mm, (ii) the parameters at the two points that are opposing in the horizontal direction are 80 mm and 80 mm, and (iii) the parameters at two points that are opposing in the vertical direction are 79 mm and 81 mm. In this case, diffA=0 and diffB=2. When the above values are substituted into the formulae (1) and (2), $\varphi A$ is 0° and $\varphi B$ is 1.2°. Further, when these values are substituted into the formula (3), QC is 1.2°.

The bending angle determination section 18B determines whether the bending angle is appropriate, on the basis of the composite angle $\varphi C$. Note that the horizontal direction and the vertical direction which are described earlier are an example, and the directions only need to be two directions orthogonal to each other.

The display processing section 15B causes the display device 30 to display the inputted parameters and/or the bending angle calculated by the auxiliary calculation section 18C. Displaying of the bending angle calculated by the auxiliary calculation section 18C, by the display processing section 15B allows the user to recognize the actual bending angle as well as the result of the determination as to the bending angle.

In addition, in a case where the parameters and the bending angle are both displayed, the display processing section 15B enables displaying of the parameters and the bending angle on a single screen. In such a case, the user can compare and check the parameters and the bending angle which are displayed side by side on the single screen, so as to prevent an erroneous input of the parameters from being overlooked.

On the display screen shown in FIG. 25, the display processing section 15B can display, in the display box BOX21, the bending angle calculated by the auxiliary calculation section 18C. Alternatively, the display processing section 15B can cause the display device 30 to display a display screen other than the display screen illustrated in FIG. 25, the other display screen having a display box for displaying the bending angle calculated by the auxiliary calculation section 18C.

Software Implementation Example

Control blocks (in particular, the image acquisition section 11, the derivation section 13, the calculation section 14, the calculability determination section 17, the input reception section 18A, the bending angle determination section 18B, and the auxiliary calculation section 18C) of each of the arithmetic apparatuses 10, 60, 90, and 90A can be realized by a logic circuit (hardware) provided in an integrated circuit (IC chip) or the like or can be alternatively realized by software.

In the latter case, the arithmetic apparatuses 10, 60, 90, and 90A each include a computer that executes instructions of a program that is software realizing the foregoing functions. The computer not only includes, for example, at least one processor but also includes a storage medium in which the program is computer-readably recorded. An object of the present invention can be achieved by the processor reading and executing, in the computer, the program stored in the storage medium. Examples of the processor include a central processing unit (CPU). Examples of the storage medium encompass "a non-transitory tangible medium" such as not only a read only memory (ROM) but also a tape, a disk, a card, a semiconductor memory, and a programmable logic circuit. The computer may further include a random access memory (RAM) or the like in which the program is loaded. The program can be made available to the computer via any transmission medium (such as a communication network or a broadcast wave) which allows the program to be transmitted. Note that an aspect of the present invention can also be achieved in the form of a computer data signal in which the program is embodied via electronic transmission and which is embedded in a carrier wave.

Aspects of the present invention can also be expressed as follows:

In order to solve the foregoing problem, a bending angle determination method in accordance with Aspect 1 of the present invention includes: an input reception step of receiving, with respect to a joint at which a spigot of a first pipe is inserted into a socket of a second pipe so as to join the first pipe and the second pipe together, inputs of respective parameters of a plurality of predetermined positions set in a circumferential direction of the first pipe, the parameters each indicating a degree to which the first pipe is inserted into the second pipe; and a bending angle determination step of determining, on the basis of the parameters that have been inputted in the input reception step, whether a bending angle at the joint is appropriate.

According to the above configuration, the bending angle determination method includes the input reception step and the bending angle determination step. The determination of whether the bending angle is appropriate is carried out in the bending angle determination step on the basis of the plurality of parameters that have been inputted in the input reception step. This enables accurate determination as to the bending angle on the basis of the parameters measured by the user who carries out the determination method.

A bending angle determination method in accordance with Aspect 2 of the present invention may further include, in the bending angle determination method in accordance with Aspect 1, an image capturing step of capturing an image of the joint; a derivation step of deriving, from the image, laying direction straight lines corresponding to respective laying directions of the pipes; and a calculability determination step of determining whether the bending angle is calculable on the basis of the laying direction straight lines, and the input reception step and the bending angle determination step may be carried out in a case where it has been determined in the calculability determination step that the bending angle is not calculable.

According to the above configuration, the bending angle determination method further includes the image capturing step, the derivation step, and the calculability determination step. In these steps, (i) an image is captured, (ii) the laying direction straight lines are derived from the image, and (iii) whether the bending angle is calculable on the basis of the laying direction straight lines is determined. In a case where the bending angle is not calculable on the basis of the laying direction straight lines, the input reception step and the bending angle determination step are carried out. Therefore, it is possible to save time and effort of the user who carries out the determination method.

A bending angle determination method in accordance with Aspect 3 of the present invention may further include, in the bending angle determination method in accordance with Aspect 1 or 2, an auxiliary calculation step of calculating the bending angle on the basis of the parameters.

The above configuration enables recognition of the actual bending angle by the user, as well as the determination as to the bending angle.

Further, a bending angle determination apparatus in accordance with Aspect 4 of the present invention includes: an input reception section configured to receive, with respect to a joint at which a spigot of a first pipe is inserted into a socket of a second pipe so as to join the first pipe and the second pipe together, inputs of respective parameters of a plurality of predetermined positions set in a circumferential direction of the first pipe, the parameters each indicating a degree to which the first pipe is inserted into the second pipe; and a bending angle determination section configured to determine, on the basis of the parameters that have been inputted into and received by the input reception section, whether a bending angle at the joint is appropriate.

The above configuration exerts an effect similar to that of the determination method described earlier.

A bending angle determination apparatus in accordance with Aspect 5 of the present invention may further include, in the bending angle determination apparatus in accordance with Aspect 4, an auxiliary calculation section configured to calculate the bending angle on the basis of the parameters and an auxiliary calculation result display section configured to enable displaying of the parameters and the bending angle on a single screen.

The above configuration enables the user to easily check the parameters and the bending angle calculated on the basis of the parameters.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 90, 90A Arithmetic apparatus (bending angle determination apparatus)
15B Display processing section (auxiliary calculation result display section)
17 Calculability determination section
18A Input reception section
18B Bending angle determination section
18C Auxiliary calculation section

The invention claimed is:

1. A bending angle determination method performed by one or more processors comprising:
an input reception step of receiving, with respect to a joint at which a spigot of a first pipe is inserted into a socket of a second pipe so as to join the first pipe and the second pipe together, inputs of respective parameters of a plurality of predetermined positions set in a circumferential direction of the first pipe, the parameters each indicating a degree to which the first pipe is inserted into the second pipe;
a bending angle determination step of determining, on the basis of the parameters that have been inputted in the input reception step, whether a bending angle at the joint is appropriate;
an image capturing step of capturing an image of the joint;
a derivation step of deriving, from the image, laving direction straight lines corresponding to respective laying directions of the pipes; and
a calculability determination step of determining whether the bending angle is calculable on the basis of the laying direction straight lines, wherein,
the input reception step and the bending angle determination step are carried out in a case where it has been determined in the calculability determination step that the bending angle is not calculable, and
in the bending angle determination step, when at least a portion of the region of the first pipe and the region of the second pipe in the image is present outside a predetermined range, it is determined that the bending angle is not calculable;
further including a contour extraction step for extracting contours of the first pipe and the second pipe,
in the contour extraction step, generating an image in which only the respective regions of the first pipe and the second pipe are extracted, extracting the contours of the respective regions as the contours of the first pipe and the second pipe from the generated image, and in the derivation step, defining a plurality of straight lines each crossing a contour of a side-surface of the first pipe and the second pipe at two points, deriving intermediate points between the two points at which the plurality of straight lines cross the contour of the side-surface, deriving an approximate intermediate line approximating the set of the intermediate points, and deriving a straight line approximating the set of the intermediate points that are present within a predetermined distance from the approximate intermediate line as the laying direction straight line.

2. The bending angle determination method according to claim 1, further comprising an auxiliary calculation step of calculating the bending angle on the basis of the parameters.

3. A bending angle determination apparatus comprising one or more processors configured to execute computer-readable instructions to:
receive, with respect to a joint at which a spigot of a first pipe is inserted into a socket of a second pipe so as to join the first pipe and the second pipe together, inputs of respective parameters of a plurality of predetermined positions set in a circumferential direction of the first pipe, the parameters each indicating a degree to which the first pipe is inserted into the second pipe; and
determine, on the basis of the parameters that have been inputted into and received by the one or more processors, whether a bending angle at the joint is appropriate;
capture an image of the joint;
derive, from the image, laving direction straight lines corresponding to respective laying directions of the pipes; and
determine whether the bending angle is calculable on the basis of the laving direction straight lines, wherein
receiving the inputs of the respective parameters and determining whether the bending angle is appropriate are carried out in a case where it has been determined that the bending angle is not calculable, and when at least a portion of the region of the first pipe and the region of the second pipe in the image is present outside a predetermined range, it is determined that the bending angle is not calculable.

4. The bending angle determination apparatus according to claim 3, wherein the one or more processors are further configured to execute computer readable instructions to:
calculate the bending angle on the basis of the parameters;
enable displaying of the parameters and the bending angle on a single screen;
extract contours of the first pipe and the second pipe,
generate an image in which only respective regions of the first pipe and the second pipe are extracted, and extract the contours of the respective regions as the contours of the first pipe and the second pipe, and
define a plurality of straight lines each crossing a contour of a side-surface of the first pipe and the second pipe at two points, deriving intermediate points between the two points at which the plurality of straight lines cross the contour of the side-surface, deriving an approximate intermediate line approximating the set of the intermediate points, and deriving a straight line approximating the set of the intermediate points that are present within a predetermined distance from the approximate intermediate line as the laving direction straight line.

* * * * *